Feb. 23, 1954    J. O. RYDBERG    2,669,745
DOOR-CLOSING DEVICE
Filed April 22, 1950    3 Sheets-Sheet 1
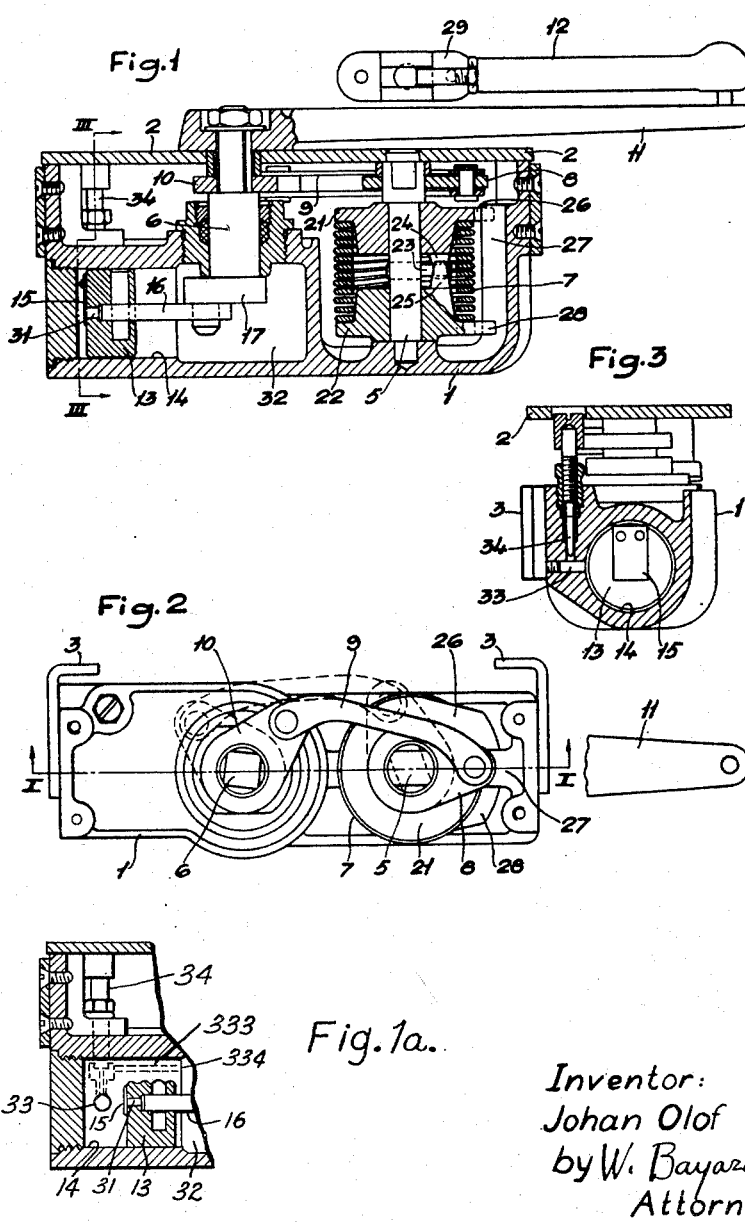

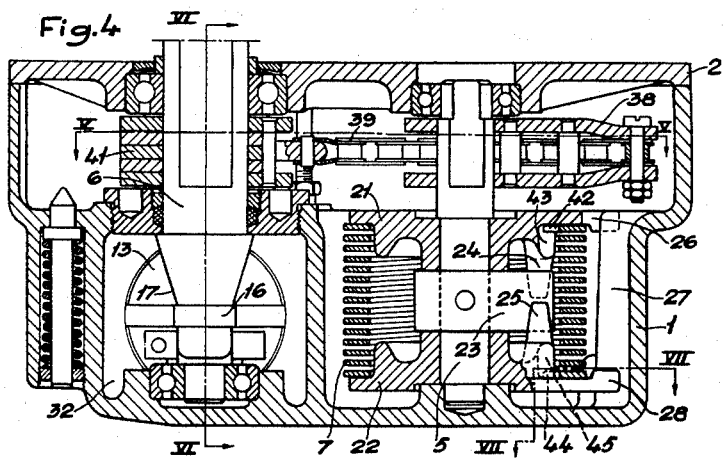
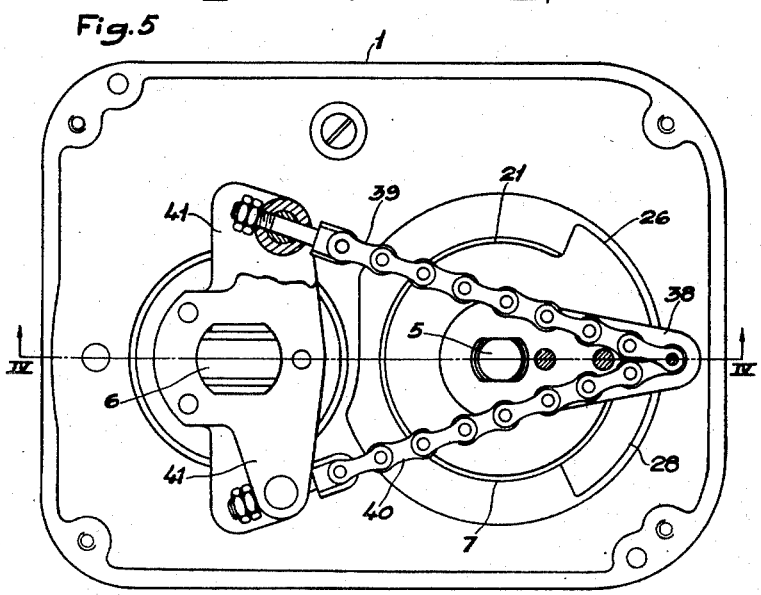

Feb. 23, 1954  J. O. RYDBERG  2,669,745
DOOR-CLOSING DEVICE

Filed April 22, 1950  3 Sheets-Sheet 3

Inventor:
Johan Olof Rydberg
by W. Bayard Jones
Attorney.

Patented Feb. 23, 1954

2,669,745

UNITED STATES PATENT OFFICE 2,669,745

DOOR-CLOSING DEVICE

Johan Olof Rydberg, Eskilstuna, Sweden, assignor to Eskilstuna Jernmanufaktur Aktiebolag, Eskilstuna, Sweden, a company of Sweden Application April 22, 1950, Serial No. 157,571

4 Claims. (Cl. 16—51)

The present invention relates to an improvement in automatic door-closing and door-checking devices of the kind comprising a frame or housing in which two parallel shafts are rotatably journalled, said shafts being connected to one another through a link and lever mechanism through which rotational motion of either of said shafts is transmitted into rotational motion of the other of said shafts, one of said shafts being connected with means for transmitting rotational motion between said shaft and the door, and vice versa, when the door is being opened and closed, and the second shaft being connected to a door-closing spring in such manner that said spring is put under tension when the said second shaft is rotated through the said link and lever mechanism in a direction that corresponds to the opening movement of the door from its closed position, the said link and lever mechanism being so designed that the turning moment which is exerted by the said spring through the said second shaft and the link and lever mechanism upon the first named shaft is at least equally large in the angular position of the first named shaft that corresponds to the closed position of the door, as in the angular position of the first named shaft that corresponds to the open position of the door, notwithstanding the fact that the tension of the spring is less in the first mentioned case than in the last mentioned case.

The purpose of the present invention is to provide a door-closing and door-checking device which is simple and inexpensive and requires little space, and yet is strong and durable and operates very reliably. With this purpose in view the present invention is characterized by the spring consisting of a helical spring which is positioned around the abovementioned second shaft, and that the check device for controlling the closing movement of the door is connected to the first named shaft. This arrangement provides the advantage that such forces as may be set up between the first named shaft and the check device and which may be quite large, for instance, if the door is forcibly shut, as by hand or by a strong draft, will not influence the link and lever mechanism, which therefore, will only be subjected to the force exerted by the spring. In this way lost motion in the said mechanism is avoided, and since the link of the said mechanism is only subjected to the tensile stress exerted by the spring, it is possible to make the said link in the form of a bendable or flexible member, such as a wire rope, a steel band or the like.

The accompanying drawings illustrate by way of example a few constructional forms of door-closing and door-checking devices embodying the present invention, the same reference numerals being used to designate similar parts in the various figures of the drawings.

Fig. 1 shows a vertical longitudinal section on the line I—I in Fig. 2 of a door-closer which is adapted to be mounted on a door, and Fig. 1a is a fragmentary sectional view similar to the left-hand end of Fig. 1 with the piston of the check device in another position.

Fig. 2 shows a top plan view of the door-closer mechanism with the door-closing arm and the top portion of the housing removed and shown partially in sections.

Fig. 3 shows a vertical cross section on the line III—III in Fig. 1.

Fig. 4 is a vertical longitudinal section on the line IV—IV in Fig. 5 of a modified form of door-closer that is adapted to be inserted in a floor and is intended for doors that may be swung in either direction from a closed position, the abovementioned shaft that is connected with means for transmitting rotational motion between said shaft and the door, being broken away at its upper end, and Fig. 5 is a top plan view of the door-closer with the top portion of the housing removed, parts of the mechanism being shown in a horizontal section on the line V—V in Fig. 4.

Figure 6:
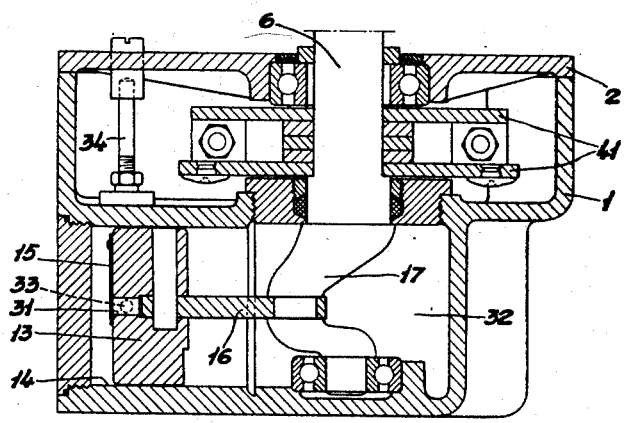
Figure 7:
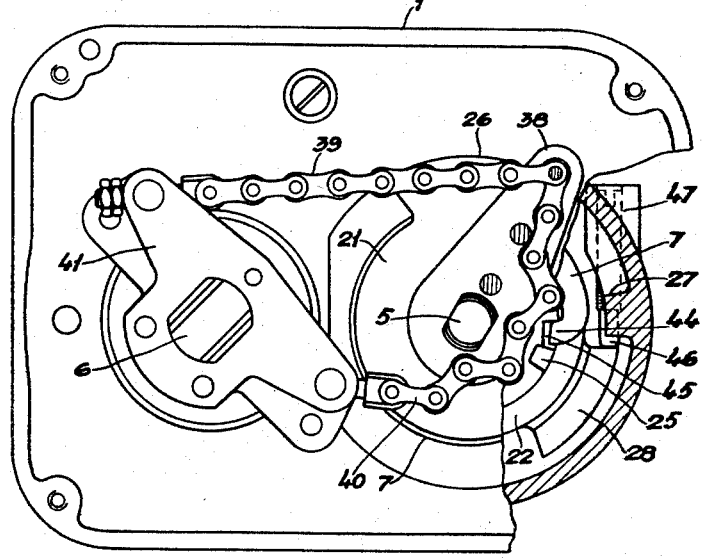

Fig. 6 shows a vertical cross section of the door-closer on the line VI—VI in Fig. 4, and Fig. 7 is a top plan view of the door-closer corresponding to that shown in Fig. 5 but showing certain parts in the positions occupied when the door has been swung partly open in the counter-clockwise direction as viewed in Fig. 7, certain parts being shown in a horizontal section on the line VII—VII in Fig. 4.

Referring to the constructional form illustrated somewhat schematically in Figs. 1, 2 and 3, I denotes the housing or frame of the door-closer which is adapted to be attached, as by means of lugs 3, to a door at the upper edge thereof and adjacent the hinged edge of the door, in a well-known manner. Rotatably mounted in the frame I and in the cover or top portion 2 thereof are two parallel vertical shafts 5 and 6. The vertical shaft 5 is surrounded by a strong helical spring 7 the ends of which are attached in any suitable manner well known in the art to hub members 21 and 22, respectively, which are rotatably mounted on the shaft 5. The shaft 5 is provided with a laterally projecting arm 23 which is embraced on one side by a depending lug 24 on the upper hub 21, and on the other side by an upright lug 25 on the lower hub 22. The spring 7 has an initial tension such that it tends to rotate the two hubs 21 and 22 in opposite directions so that the lugs 24 and 25 are forced against the said arm 23. The upper hub 21 is provided with a radial projection 26 which bears against the rear face, as viewed in Fig. 1, of a shoulder 27 on the inside of the frame 1, and the lower hub 22 is provided with a corresponding projection 28 which bears against the front face of the said shoulder 27. It will be understood that if the shaft 5 is caused to rotate in the counterclockwise direction, as viewed in Fig. 2, the arm 23 on the shaft 5 will act upon the lug 24 on the upper hub 21 and cause the said hub to rotate with the shaft 5, while the projection 28 on the lower hub 22 will bear against the shoulder 27, thus preventing the lower hub 22 from rotating with the shaft. In this way, therefore, the spring 7 will be put under additional tension, when the shaft 5 is rotated in the counter-clockwise direction, as above assumed, and will thus exert a turning moment on the upper hub 21 and on the shaft 5 tending to turn said shaft in the opposite i. e. clockwise direction.

The shafts 5 and 6 are connected to one another through a link and lever mechanism which, in the construction illustrated, comprises a lever 8 secured to the upper end of the shaft 5 and connected through a connecting link 9 with a lever 10 secured to the shaft 6. Attached to the upper end of the shaft 6, which projects above the cover 2 of the frame 1, is the usual door-closing arm 11, the free end of which is hingedly connected through a connecting rod 12 with a hinge member 29 which is adapted to be fastened to the upper piece of the doorframe. Assuming that when the door, to which the frame 1 of the door-closer is attached, is opened, the door-closing arm 11 turns in the counter-clockwise direction as viewed in Fig. 2 relatively to the frame 1, the counter-clockwise rotation thus imparted to the shaft 6 is transmitted through the link and lever mechanism 10, 9, 8 to the shaft 5 which is thus also caused to rotate in the counter-clockwise direction as viewed in Fig. 2, for instance to the position of the link and lever mechanism shown in dashed outlines in Fig. 2.

By proper selection of the dimensions of the parts of the link and lever mechanism and the angular positions of the arms 8 and 10 thereof relatively to the plane through the axes of the shafts 5 and 6 the result can be attained that, in spite of the fact that the tension of the spring 7 is smallest when the door is in its closed position, still the turning moment exerted by the spring 7 upon the shaft 6 and thus upon the door is greater when the door is in its closed position than when the door is in an open position. This will be understood from a consideration of Fig. 2 in which the perpendicular from the axis of the shaft 6 to the link 9, i. e. to a line drawn through the centers of the pivots of said link, is larger in the position of the link and lever mechanism shown in full drawn lines, which position corresponds to the closed position of the door, than in the position of the link and lever mechanism shown in dashed outlines. In addition, the perpendicular from the axis of the shaft 5 to the link 9 is considerably shorter in the full drawn position of the link and lever mechanism than in the position shown in dashed outlines, which means that the leverage with which the spring acts upon the link is considerably larger in the first named case than in the last named case.

It will be understood that when the door is being opened, causing the shaft 6 to rotate in the counterclockwise direction in Fig. 2, the link 9 is subjected to a pulling force causing a tensile stress in the link, and similarly, when the door is released the spring 7 produces a pull in the link 9 causing clockwise rotation of the shaft 6. Therefore, the link 9 is only subjected to tensile stresses, and it can not be subjected to larger forces than those produced by the spring even if the door is forcibly closed as by hand or by a draft. It will be understood that there will be no lost motion in the link and lever mechanism, and that as the link 9 is only subjected to pulling forces, it may be replaced by a bendable or flexible member, such as a wire rope or a steel band.

The check device which serves to check or brake the closing movement of the door under the influence of the spring 7, consists in a manner well known in the art of a piston 13 which is movable in a cylinder 14 provided in the lower portion of the housing 1. The piston 13 is connected by means of a connecting rod 16 to a crank 17 on the lower end of the shaft 6. The piston 13 is provided with a through opening 31 extending from a recess in the piston for the connecting rod to the left-hand face of the piston, as viewed in Fig. 1, where the said opening 31 is provided with a check valve which, in the instance illustrated, consists of a leaf spring 15 attached to the face of the piston. When the door is opened and the shaft 6 rotates in the counter-clockwise direction as viewed in Fig. 2, the crank 17 pulls the piston 13 to the right in Fig. 1. The brake liquid, such as oil, present in the cylinder 14 on the right-hand side of the piston 13 and in the chamber 32 below the shaft 6, then flows through the opening 31 and past the valve 15 into the chamber of the cylinder 14 to the left of the piston as viewed in Fig. 1. When the door swings to closed position under the action of the spring 7 which rotates the shaft 6 in the clockwise direction, the crank 17 pushes the piston 13 to the left in Fig. 1. During this movement the valve 15 is closed, and the liquid present in the chamber of the cylinder 14 to the left of the piston 13 flows out through a passage 33, 333 leading from the inner surface of cylinder 14 to port 334 in the above-mentioned chamber 32 and controlled by a needle valve 34, as shown in Figs. 1a and 3. The arrangement and function of this passage 33, 333 and its control valve 34 are well known in the art and need not, therefore, be further described. Due to the restricted outflow of the liquid from the chamber to the left of the piston 13, the closing movement of the door is effectively braked. If the door-closer is operated when not mounted on a door, the force acting on the link and lever mechanism and the force acting between shaft 6 and piston 13 are dependent upon one another, but when the door-closer is mounted on a door, an increase of the force between shaft 6 and piston 13 will arise due in part to the inertia of the door and in part to additional forces on the door due for instance to a draft or a strong wind or when an attempt is made to force the door shut. Such an increase of the force acting between shaft 6 and piston 13 does not influence the link and lever mechanism which is only subjected to the force that is produced by the spring 7.

In the constructional form illustrated in Figs. 1 to 3 inclusive, the check device is located in the frame 1 in such manner that the axis of the piston 13 lies in the plane through the axes of the shafts 5 and 6. By this arrangement the frame or housing 1 may be given the shape of a relatively narrow, substantially parallelepipedic box which is suitable for mounting on a door. The piston 13 and cylinder 14 being located at the lower end of the shaft 6 below the lever 10, it is possible to construct the check device in such manner that it does not materially increase the dimensions of the door-closer as a whole beyond what is necessary for allowing the swinging movement of the lever 10.

The door-closer illustrated in Figs. 4 to 7 inclusive is adapted to be inserted in a floor below that edge of the door where the axis of rotation of the door is located, and in such manner that the top portion or cover 2 of the housing 1 of the door-closer lies substantially flush with the surface of the floor. Also, in this construction there are rotatably mounted in the housing 1 and in the cover 2 thereof two parallel vertical shafts 5 and 6. The vertical shaft 5 is surrounded by a strong helical spring 7. The construction of the spring and the means for transmitting the tension of the spring to the shaft 5 are substantially similar to those above described in connection with Figs. 1 to 3 inclusive, and include an upper hub member 21 and a lower hub member 22, both rotatably mounted on the shaft 5, and a laterally projecting arm 23 secured to the shaft 5 and embraced by a depending lug 24 on hub 21 and an upright lug 25 on hub 22. The upper hub 21 is provided with a projection 26 which bears against the rear face, as viewed in Fig. 4, of the shoulder 27 on the inside of the housing 1, and the lower hub 22 is provided with a corresponding projection 28 which bears against the end 46 of an adjustment screw 47 which is screw-threaded through the housing 1 and passes through the said shoulder 27, as shown in Fig. 7. The upper inwardly bent end 42 of the spring 7 is inserted in a recess 43 in the upper hub 21, and the lower inwardly bent end 44 of the spring 7 is inserted in a recess 45 in the lower hub 22, Figs. 4 and 7. Also in this case the spring 7 has an initial tension such that it tends to rotate the two hubs 21 and 22 in opposite directions, so that the two lugs 24 and 25 are forced against opposite sides of the arm 23, and so that in the positions shown in Figs. 4 and 5 the projection 26 on hub 21 bears against the rear face of the shoulder 27 and the projection 28 bears against the end 46 of the adjustment screw 47, which is provided to ensure that the two lugs 24 and 25 and the two projections 26 and 28 are simultaneously in contact with the opposed surfaces on the arm 23 and on the shoulder 27 and screw 46, respectively, so as to eliminate lost motion. It will be understood that if the shaft 5 is rotated in the counter-clockwise direction as viewed in Fig. 2, the upper hub 21 will be rotated in the same direction by the arm 23 and will carry along the upper end 42 of the spring 7, whereas the lower end 44 of the spring 7 is held stationary by the projection 28 holding the lower hub 22 from rotation. In this way the spring is put under additional tension. Similarly, if the shaft 5 is rotated in the clockwise direction in Fig. 5 the lower hub 22 will be rotated by the arm 23 while the upper hub 21 is held stationary, and also in this case, therefore, additional tension is put upon the spring.

The link and lever mechanism which connects the two shafts 5 and 6 with one another comprises a lever 38 which is secured to the upper end of the shaft 5, and two links in the form of chains 39 and 40 which are hingedly connected to the outer end of said lever 38. Said chains may suitably consist of lengths of a sprocket chain, such as a cycle chain which has proved to be very suitable for this purpose. The other ends of the chains are hingedly attached to the ends of a two-armed lever 41 which is secured to the shaft 6. The upper end of this shaft projects above the cover 2 and is assumed to be connected through suitable means well known in the art and not illustrated in the drawing, to the lower pivot of the door, also not shown in the drawing, so that the shaft 6 is always rotated in the same direction as the door is swung. When the door is swung in the counter-clockwise direction as viewed in Figs. 5 and 7 from its closed position which corresponds to the position of the parts shown in Fig. 5, the shaft 6 is thus also rotated in the same direction, for instance to the position of the parts shown in Fig. 7, and the rotational movement of the lever 41 is transmitted through the chain 39 to the lever 38 which rotates the shaft 5 in the counter-clockwise direction. In this way additional tension is applied to the spring 7, as above explained, with the result that when the door is released, the spring will rotate the shaft 5 and the lever 38 in the clockwise direction, such movement being transmitted through the chain 39 to the lever 41 and shaft 6, so that the door is swung back in the clockwise direction to its closed position. It will readily be understood that if the door is swung open in the clockwise direction, as viewed in Fig. 5, the shaft 6 and the lever 41 will be rotated in the same direction, and the turning moment of the lever 41 will be transmitted through the chain 40 to the lever 38 causing the latter and the shaft 5 to turn in the clockwise direction, whereby, as above explained, the spring 7 is put under tension so that, as soon as the door is released, the spring will rotate the shaft 5 and the lever 38 in the counter-clockwise direction, the movement of the lever 38 being transmitted through the chain 40 to the lever 41 and shaft 6, so that the door is swung in the counter-clockwise direction back to its closed position.

Also in this case it is possible, by suitably dimensioning and adjusting the link and lever mechanism, to attain that the turning moment exerted by the spring 7 upon the shaft 6 and thus upon the door is greater immediately before the door reaches its closed position than when the door occupies its open position, as above explained in connection with the constructional form illustrated in Figs. 1 to 3 inclusive. Due to its initial tension the spring 7 will resist any tendency of the lever 38 to move from its middle position.

The check device which serves to check or brake the closing moment of the door under the influence of the spring 7, consists in a manner well known in the art of a piston 13, Figs. 4 and 6, which is movable in a cylinder 14 provided in the lower portion of the housing 1, the piston being connected by means of a connecting rod 16 to a crank 17 on the lower end of the shaft 6. When the door is swung in either direction from its closed position and the crank 17 is rotated from its intermediate position shown in Fig. 6, the crank pulls the piston 13 to the right in Fig. 6 so that the liquid contained in the chamber 32 and in the cylinder 14 to the right of the piston 13 flows through the opening 31 in the piston and past the leaf spring valve 15 into the chamber in the cylinder 14 to the left of the piston 13.

When the door returns to its closed position, the crank 17 pushes the piston 13 to the left in Fig. 6, and the liquid contained in the chamber of the cylinder 14 to the left of the piston 13 is forced out through a passage 33 which leads to the above-mentioned chamber 32 and is provided with a needle valve 34, in a manner well known in the art and as above described in connection with Figs. 1 to 3 inclusive. By regulating the outflow through the passage 33 by means of the valve 34 the desired braking or checking action on the door during its closing movement can easily be obtained. Also in this case the forces acting between the shaft 6 and the piston 13 due to additional forces acting on the door, such as a draft or an attempt to force the door shut, will not influence the link and lever mechanism between the two shafts.

In the constructional form illustrated in Figs. 4 to 7 inclusive, the check device is located in such manner that the axis of the piston 13 forms right angles with the plane through the axes of the shafts 5 and 6. This arrangement provides the advantage that the housing 1 can be shaped in a manner that is suitable for a floor door-closer, as the housing need not extend to the left of the shaft 6 as viewed in Figs. 4 and 5, farther than is necessary in order to provide clearance for the swinging movement of the lever 41. Consequently, the housing need not extend very far below the upright of the door-frame adjacent which the pivots of the door are located.

It will be understood that the links or chains 39 and 40 used in the constructional form just described are only subjected to pulling forces when the door is swung open in either direction as well as when the spring returns the door to its closed position.

I claim:

1. A door-closing and checking device of the character described, comprising a housing, a first shaft rotatably journalled in said housing, means connected with said shaft for transmitting rotary motion from said shaft to the door and from the door to said shaft, a check device operatively connected to said first shaft, a second shaft parallel to said first shaft and rotatably journalled in said housing, a link and lever mechanism connecting said shafts to one another and adapted to transmit rotary motion from either of said shafts to the other of said shafts, and a helical spring positioned around said second shaft coaxial therewith and connected at one point to said housing and at another point to said second shaft whereby said spring is put under tension when said second shaft is rotated by said link and lever mechanism in a direction corresponding to the opening movement of the door from its closed position, said link and lever mechanism comprising a first lever secured to said first shaft in such manner that in the position of said first shaft that corresponds to the closed position of the door said first lever forms an angle to the line of connection between the axes of said first and second shafts and upon rotation of said first shaft in a direction corresponding to the opening movement of the door the outer end of said first lever is moved away from said second shaft, a second lever secured to said second shaft in such manner that in the position of said second shaft that corresponds to the closed position of the door said second lever is directed away from said first shaft and upon rotation of said second shaft in a direction corresponding to the opening movement of the door said second lever is moved in a direction towards said first shaft, and a link member having an unvarying length hingedly attached at its ends to the ends of said first and second levers.

2. A door-closing and checking device as defined in claim 1, in which the link member is a flexible link member hingedly attached to the ends of said first and second levers.

3. A door-closing and checking device as defined in claim 1, in which the link and lever mechanism comprises a two-armed lever secured to the first shaft, a single-armed lever secured to the second shaft, and two flexible link members, each such member having one of its ends hingedly attached to the end of one of the arms of said double-armed lever on the first shaft and its other end hingedly attached to the end of the lever on the second shaft.

4. A door-closing and checking device as defined in claim 1, in which the check device comprises a cylinder, a piston movable in said cylinder, a crank on the first shaft, and a connecting rod connecting said piston with said crank, said check device being located in the housing in such manner that the axis of the piston of said device forms right angles to a vertical plane through the axes of the first and second shafts.

JOHAN OLOF RYDBERG.

References Cited in the file of this patent

UNITED STATES PATENTS

| Number | Name | Date |
|--------|------|------|
| 1,447,630 | Richter | Mar. 6, 1923 |
| 1,832,699 | Garrison | Nov. 17, 1931 |
| 2,085,593 | Lasier | June 29, 1937 |
| 2,133,709 | Lasier | Oct. 18, 1938 |
| 2,360,095 | Aspinwall | Oct. 10, 1944 |